United States Patent
Hamilton et al.

(10) Patent No.: US 9,713,842 B2
(45) Date of Patent: Jul. 25, 2017

(54) METHOD FOR COATING PARTICLES

(75) Inventors: Hugh Gavin Charles Hamilton, Reading (GB); Debra Sarah Jones, Chinnor (GB)

(73) Assignee: ANGLO PLATINUM MARKETING LIMITED, London (GB)

( * ) Notice: Subject to any disclaimer, the term of this patent is extended or adjusted under 35 U.S.C. 154(b) by 887 days.

(21) Appl. No.: 13/130,484

(22) PCT Filed: Nov. 20, 2009

(86) PCT No.: PCT/GB2009/051581
§ 371 (c)(1),
(2), (4) Date: Aug. 1, 2011

(87) PCT Pub. No.: WO2010/058223
PCT Pub. Date: May 27, 2010

(65) Prior Publication Data
US 2011/0281132 A1 Nov. 17, 2011

(30) Foreign Application Priority Data
Nov. 21, 2008 (GB) .................................. 0821304.3

(51) Int. Cl.
*B22F 1/02* (2006.01)
*C04B 35/628* (2006.01)

(52) U.S. Cl.
CPC .......... *B22F 1/02* (2013.01); *C04B 35/62842* (2013.01); *C04B 35/62892* (2013.01); *B22F 2998/00* (2013.01); *B22F 2998/10* (2013.01); *B22F 2999/00* (2013.01); *C04B 2235/3217* (2013.01); *C04B 2235/3244* (2013.01); *C04B 2235/528* (2013.01); *Y10T 428/12028* (2015.01); *Y10T 428/2991* (2015.01); *Y10T 428/2993* (2015.01)

(58) Field of Classification Search
CPC ........ B22F 1/02; B22F 1/025; B22F 2202/17; B22F 2998/00
USPC .......................................................... 419/64
See application file for complete search history.

(56) References Cited

U.S. PATENT DOCUMENTS

| | | | |
|---|---|---|---|
| 4,885,214 A | 12/1989 | Trenkler | |
| 5,760,331 A | 6/1998 | Lowden | |
| 5,882,802 A * | 3/1999 | Ostolski | ........................ 428/570 |
| 6,287,445 B1 | 9/2001 | Lashmore | |
| 2003/0067838 A1 | 4/2003 | Schmidt | |

(Continued)

FOREIGN PATENT DOCUMENTS

| | | |
|---|---|---|
| EP | 1598393 | 11/2005 |
| EP | 2036635 A1 | 3/2009 |

(Continued)

OTHER PUBLICATIONS

International Search Report dated Feb. 12, 2010, application No. PCT/GB2009/051581.

(Continued)

*Primary Examiner* — Weiping Zhu
(74) *Attorney, Agent, or Firm* — Young & Thompson

(57) ABSTRACT

The present invention relates to a method for coating primary particles with secondary particles using dual asymmetric centrifugal forces wherein, the primary particles comprise (a) at least one metal, or (b) at least one ceramic; the secondary particles comprise at least one metal or salt thereof; and wherein the secondary particles are more malleable than the primary particles.

26 Claims, 5 Drawing Sheets

(56) References Cited

U.S. PATENT DOCUMENTS

| | | | | |
|---|---|---|---|---|
| 2005/0226760 A1* | 10/2005 | Lindenau | ............. | B22F 1/0059 |
| | | | | 419/36 |
| 2008/0035244 A1* | 2/2008 | Suzuki et al. | ................ | 148/266 |
| 2009/0042013 A1 | 2/2009 | Finter | | |
| 2010/0178510 A1 | 7/2010 | Kaneko et al. | | |

FOREIGN PATENT DOCUMENTS

| | | | |
|---|---|---|---|
| GB | 1413980 | | 11/1975 |
| JP | 61119602 | | 6/1986 |
| JP | 5320703 | | 12/1993 |
| JP | 06309919 | A | 11/1994 |
| JP | 7090309 | | 4/1995 |
| JP | 07090309 | A * | 4/1995 |
| JP | 111733 | A | 1/1999 |
| JP | 200111593 | A | 1/2001 |
| JP | 200643578 | A | 2/2006 |
| WO | 9825721 | | 6/1998 |
| WO | 2007148734 | A1 | 12/2007 |
| WO | 2008078685 | A1 | 7/2008 |

OTHER PUBLICATIONS

Great Britain Search Report dated Jan. 21, 2009, application No. GB0821304.3.
Rawle, "Basic Principles of Particle Size Analys,is," Technical Paper No. MRK034, Malvern Instruments Limited. 2001, pp. 1-8.
Brittain, "Particle Size Distribution Part I: Representation of Particle Shape, Size, and Distribution", Pharmaceutical Technology, Dec. 2001, pp. 38-45.

\* cited by examiner

METHOD FOR COATING PARTICLES

CROSS-REFERENCE TO RELATED APPLICATIONS

This application is the U.S. National Phase application of PCT International Application No. PCT/GB2009/051581, filed Nov. 20, 2009, and claims priority of British Patent Application No. 0821304.3, filed Nov. 21, 2008, the disclosures of both of which are incorporated herein by reference in their entirety for all purposes.

FIELD OF THE INVENTION

The present invention relates to a method for producing coated particles and, in particular, a method for producing coated particles using dual asymmetric centrifugal forces.

BACKGROUND OF THE INVENTION

A very wide range of metal alloys are used for different applications, each alloy offering a particular combination of properties, including strength, ductility, creep resistance, corrosion resistance, fatigue resistance and castability. Alloys are commercially available in a number of physical forms and purities, depending upon the requirements of the end-application. Most large end-use metals and alloys are deliverable in sheet, rod and bar form, with an increasing number becoming available in the form of high quality powders for application within powder metallurgical processes. These processes allow manufacture, for example, of parts with complex geometries and avoid excessive machining and hence waste of expensive bulk alloy. It also allows manufacture of parts in a more diverse range of alloys than is commonly used within the larger industrial businesses.

Using the titanium industry as an example, the global production of titanium is relatively small and the majority of titanium currently produced finds use within the aerospace industries, predominantly as a very limited selection from the commonly accepted ASTM "grades" of titanium and titanium alloys. Other industries, however, have encountered difficulties in sourcing the titanium alloy they require and many suppliers and manufacturers find it undesirable to maintain a large stock of a range of different titanium alloys as a result of the high price of titanium. The shortage of supply of titanium and the dominance of Ti-6Al-4V as the standard "workhorse" alloy means that commercialization of alternative alloy formulations, and even the use of the standard accepted alloy grades, can be stifled.

For example, although pure titanium is highly resistant to corrosion, its corrosion resistance can be improved by forming an alloy with precious metals such as palladium and/or ruthenium. Likewise, the corrosion resistance of Ti-6Al-4V may be similarly improved by the addition of palladium or ruthenium. These precious metal-modified alloys are listed, along with many others, within the commonly accepted ASTM grades of titanium alloys. These alloy grades find only limited application, due in part to both their poor availability and also to the additional expense of the precious metal. Machining of standard alloy forms to complex geometries, and the resulting wasted material, further increases the expense. Improvements in powder metallurgical processing, and especially a flexible method to incorporate the precious metal, would lead to the ability to manufacture parts and exploit the beneficial alloy properties whilst minimizing expense.

Cermets have been designed so that they display characteristics of both the ceramic and metallic components. In this regard, the ceramic component may contribute a high temperature resistance and hardness, while the metal component can contribute plastic deformation. Cermets have found use in the electronic industry (in the manufacture of resistors and capacitors), ceramic-to-metal joints and seals, as well as in medical applications, such as dentistry.

SUMMARY OF THE INVENTION

The rapid manufacture of a desired composition comprising a primary metal or ceramic and at least one secondary metal or salt thereof would allow a manufacturer to store a reduced inventory while enabling the rapid manufacture of a range of alloys or cermets, as well as the articles produced therefrom. The inventors believe that the ability to generate a tailored composition with required properties would encourage the use of those compositions. In addition, the subsequent fabrication of articles from the alloys would accordingly be facilitated as the period of time within which the wrought alloy or cermet is purchased would be reduced or even eliminated.

Accordingly, the present invention provides a method for forming coated particles comprising coating primary particles with secondary particles using dual asymmetric centrifugal forces, wherein:

the primary particles comprise (a) at least one metal, or (b) at least one ceramic;

the secondary particles comprise at least one metal or salt thereof; and wherein the secondary particles are more malleable than the primary particles.

Within the context of the present invention, "malleable" means to be pressed permanently out of shape.

The secondary particles are coated onto the primary particles using dual asymmetric centrifugal forces. By "dual asymmetric centrifugal forces" we mean that two centrifugal forces, at an angle to each other, are simultaneously applied to the particles. In order to create an efficient mixing environment, the centrifugal forces preferably rotate in opposite directions. The Speedmixer™ by Hauschild (http://www.speedmixer.co.uk/index.php) utilises this dual rotation method whereby the motor of the Speedmixer™ rotates the base plate of the mixing unit in a clockwise direction (see FIG. 1A) and the basket is spun in an anti-clockwise direction (see FIGS. 1B and 1C). While not wishing to be bound by theory, the inventors believe that the coating process results in a physical change in the primary and secondary particles whereby the particles are physically cojoined.

When the primary particles comprise at least one metal, the at least one metal is selected from the group consisting of Group IVB, Group VB, Group VIB, Group VIIB and Group VIII of the Periodic Table and more preferably from Group IVB, Group VIB and/or Group VIII. Most preferably, the primary particles comprise at least one of titanium, molybdenum, tungsten, nickel or iron.

The primary particles may comprise a single metal, an admix of metal, an alloy or a combination thereof. When the primary particles comprise a single metal, titanium (e.g. commercially available titanium) is preferred. When the primary particles comprise an alloy, titanium alloys (e.g. Ti-6Al-4V) or iron alloys (e.g. steel and, in particular, stainless steel) are preferred.

When the primary particles are ceramic, the particles preferably comprise at least one of silicon, zirconium, aluminium, yttrium, cerium or titanium. More preferably, the primary particles are ceramic oxides or ceramic carbides. Even more preferably, the primary particles are selected from the group consisting of at least one silicon oxide, aluminium oxide, zirconium oxide, titanium oxide, yttrium oxide, cerium oxide, silicon carbide and tungsten carbide.

The primary particles may be substantially spherical, irregular or a combination thereof.

In one embodiment, the primary particles are substantially spherical. In this case, the size of the substantially spherical particles may be any suitable size. In one embodiment, however, the primary particles preferably have an average diameter of about ≤2000 μm, more preferably about ≤1500 μm and even more preferably, about ≤1000 μm. In another embodiment, the particles have an especially preferred average diameter of about 1 μm to about 45 μm, in particular, when the primary particles comprise titanium.

In another embodiment, the primary particles are irregular. "Irregular" in the context of the present invention means particles which are not substantially spherical. The size of the irregular particles may be any suitable size and may be defined by any suitable parameter (for example, see Rawle, "Basic Principles of Particle Size Analysis", which is available from www.malvern.com, and Brittain, "Particle-Size Distribution, Part I: Representations of Particle Shape, Size and Distribution", Pharmaceutical Technology, December 2001, each of which are hereby incorporated by reference in its entirety for all purposes).

The inventors have found that the shape of the primary particles (whether substantially spherical and/or irregular) remains substantially unchanged during coating. This is surprising as the application of dual asymmetric centrifugal forces is a high-energy process. In the case of substantially spherical primary particles, the production of substantially spherical coated particles is advantageous because the flowability of the coated particles is improved, which assists in downstream processing.

The secondary particles preferably comprise a single metal, an admix of metals, a metal salt, an alloy or a combination thereof. In one embodiment, the secondary particles are selected for the group consisting of Group VIII, Group IB and Group IIIA of the Periodic Table. Preferably, the secondary particles comprise at least one of platinum, palladium, rhodium, ruthenium, iridium, osmium, silver, gold, cobalt, copper, nickel, iron or aluminium.

When the secondary particles comprise a single metal, the metal is preferably palladium or ruthenium.

In another embodiment, the secondary particles may comprise an admixture of metals, preferably an admix of palladium and ruthenium.

In yet another embodiment, when the secondary particles comprise an alloy, a preferred alloy is one of palladium and ruthenium.

When the secondary particles comprise one or more metal salts, the salt is not limited provided it is neither combustible nor explosive. Preferably, the metal salt is a palladium or ruthenium salt and more preferably a palladium salt (for example, tetramminepalladium hydrogencarbonate or hexakis(aceto)tripalladium(II)). Optionally, the coated particles can be further processed by thermal or chemical means. In one embodiment, the at least one metal salt coating the primary particles may be reduced. The reduction may be suitably carried out at an elevated temperature under an atmosphere comprising hydrogen for a suitable period of time (e.g. at least 30 minutes). More preferably, the reduction is carried out at about 300° C. or above. Alternatively, the at least one metal salt coating the primary particles may be oxidised. In this case, the oxidation may be suitably carried out at an elevated temperature under an atmosphere comprising oxygen (for example, air) for a suitable period of time (e.g. at least 30 minutes). More preferably, the oxidation is carried out at about 500° C. or above.

BRIEF DESCRIPTION OF THE FIGURES

The invention will now be described with reference to the following drawings in which:

FIG. 1A is a view from above showing the base plate and basket.

The base plate rotates in a clockwise direction.

Figure 1A:
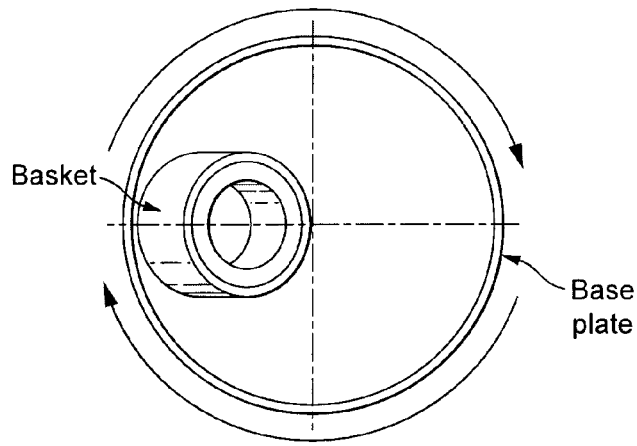
FIGS. 1A-C illustrate how the centrifugal forces are applied to the particles in the Speedmixer™.
Figure 1B:
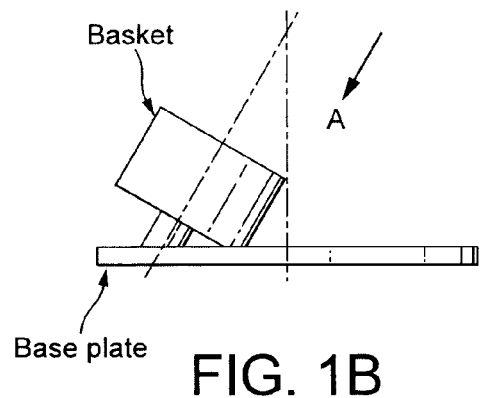

FIG. 1B is a side view of the base plate and basket.

Figure 1C:
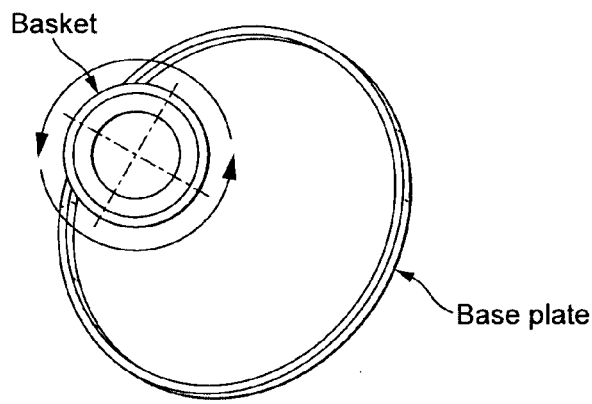

FIG. 1C is a view from above along line A in FIG. 1B. The basket rotates in an anti-clockwise direction.

Figure 2:
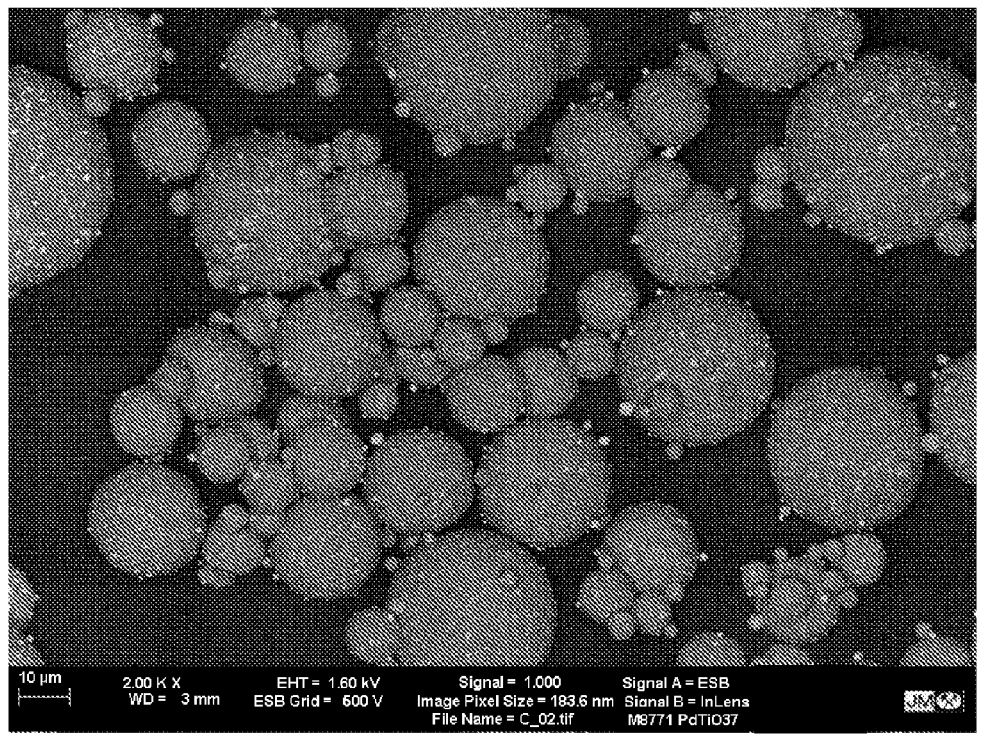

FIG. 2 is a backscattered electron image of substantially spherical titanium powder (<45 μm) coated with 0.2 wt % palladium.

Figure 3:
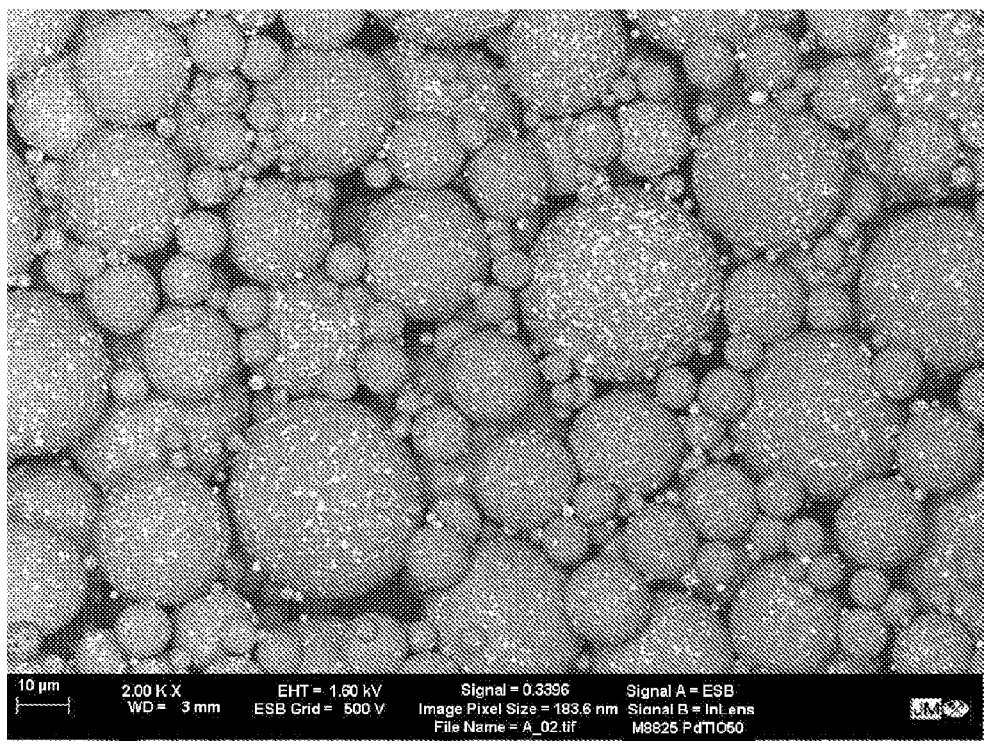

FIG. 3 is a backscattered electron image of substantially spherical titanium powder (<45 μm) coated with 0.2 wt % palladium.

Figure 4:
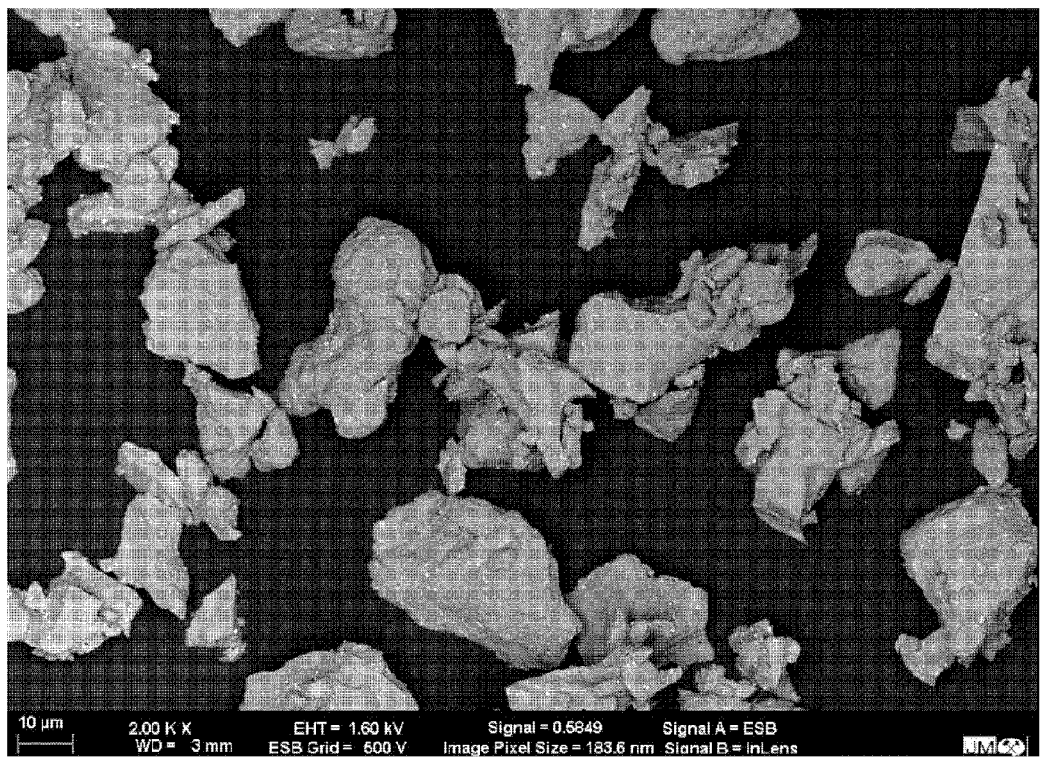

FIG. 4 is a SEM image of palladium dispersed on the surface of irregular titanium particles.

Figure 5:
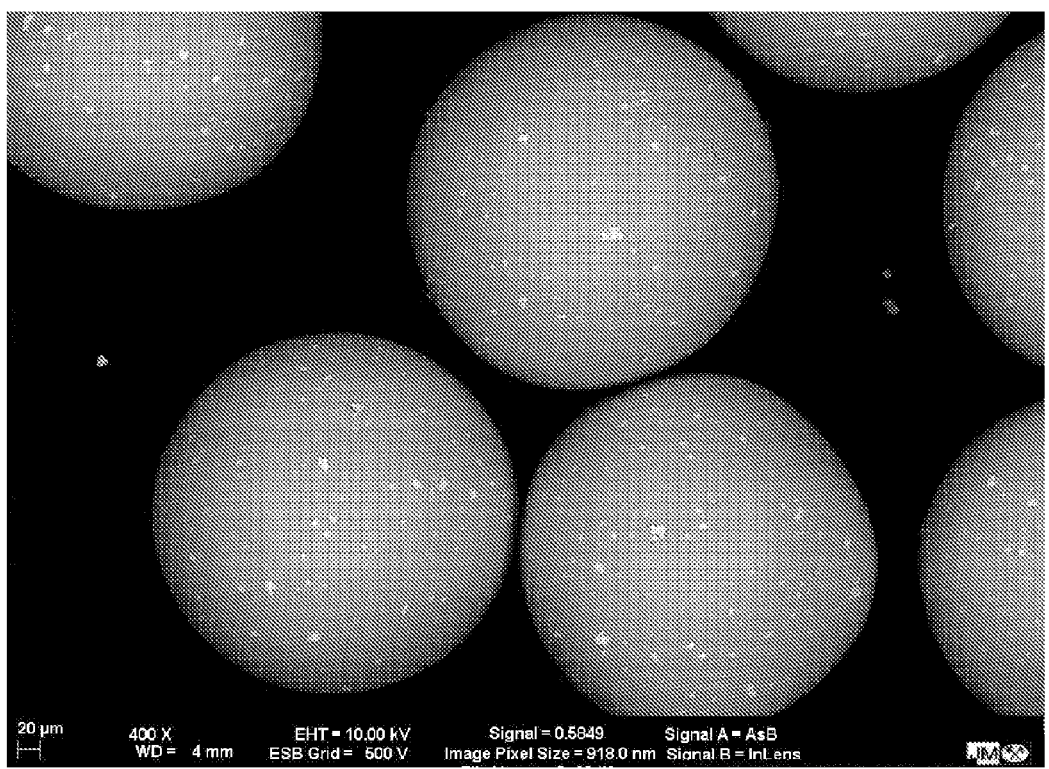

FIG. 5 is a SEM of palladium dispersed on the surface of substantially spherical zirconia beads.

Figure 6:
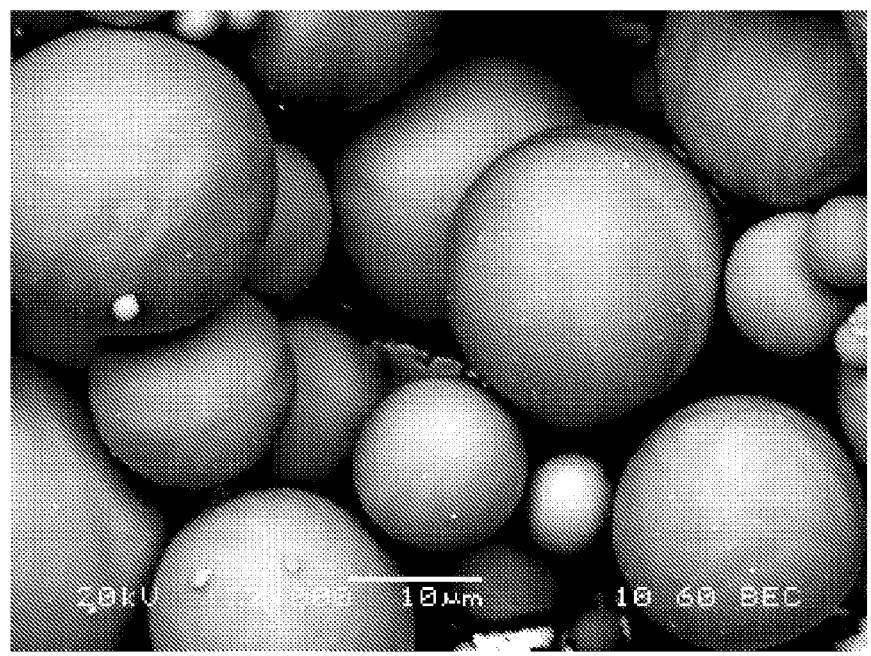

FIG. 6 is a SEM image of ruthenium dispersed on the surface of substantially spherical titanium powder.

Figure 7:
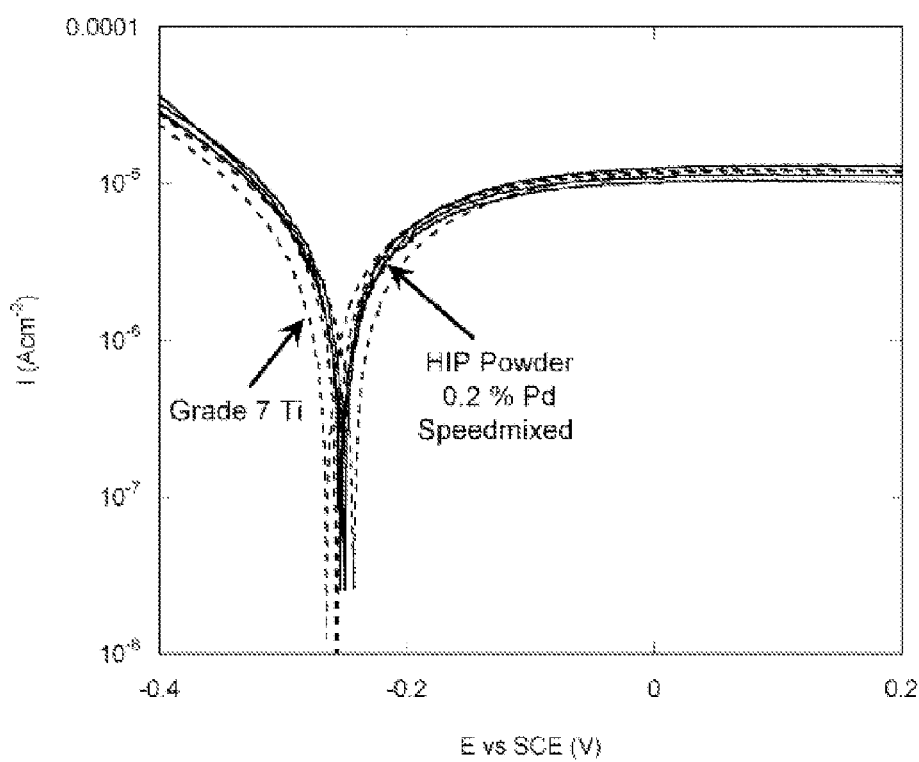

FIG. 7 is a graph comparing the corrosion potential (open circuit potential) vs. time for (a) a HIP-ed powder produced according to the present invention and (b) commercially available Grade 7 Ti—Pd alloy.

DETAILED DESCRIPTION OF THE INVENTION

The coating process may be controlled by various parameters including the rotation speed at which the process takes place, the length of processing time, the level to which the mixing container is filled, the use of milling media and/or the control of the temperature of the components within the milling pot.

The dual asymmetric centrifugal forces may be applied for a continuous period of time. By "continuous" we mean a period of time without interruption. Preferably, the period of time is about 1 second to about 10 minutes, more preferably about 5 seconds to about 5 minutes and most preferably about 10 seconds to about 200 seconds.

Alternatively, the dual asymmetric centrifugal forces may be applied for an aggregate period of time. By "aggregate" we mean the sum or total of more than one periods of time. The advantage of applying the centrifugal forces in a stepwise manner is that excessive heating of the particles can be avoided. The dual asymmetric centrifugal forces are preferably applied for an aggregate period of about 1 second to about 10 minutes, more preferably about 5 seconds to about 5 minutes and most preferably about 10 seconds to about 150 seconds. The number of times (e.g. 2, 3, 4, 5 or more times) in which the dual asymmetric centrifugal forces are applied will depend upon the nature of the primary and secondary particles. For example, when the primary particles comprise titanium, stepwise application of the centrifugal forces minimises heating of the particles thus minimising the risk of oxidation and/or combustion. In a particularly preferred embodiment, the dual asymmetric centrifugal forces are applied in a stepwise manner with periods of cooling therebetween. In another particularly preferred embodiment, the dual asymmetric centrifugal forces may be applied in a stepwise manner at one or more different speeds.

Preferably, the speed of the dual asymmetric centrifugal forces is from about 200 rpm to about 3000 rpm. In one embodiment, the speed is from about 300 rpm to about 2500 rpm. In another embodiment, the speed is from about 500 rpm to about 2000 rpm.

The level to which the mixing container is filled is determined by various factors which will be apparent to the skilled person. These factors include the apparent density of the primary and secondary particles, the volume of the mixing container and the weight restrictions imposed on the mixer itself.

Certain metals or metal alloys possessing a strong affinity for oxygen suffer from excessive surface oxide growth if the milling is carried out in the presence of oxygen. In particular, if the coated particles are to be used to produce a final, compacted article that should conform to a recognised specification for oxygen content, it may also be required that an oxygen-deficient atmosphere is to be used. Moreover, an oxygen-deficient atmosphere may be suitable when the secondary particles comprise at least one metal salt which is air sensitive. Accordingly, the coating process of the present invention may be carried out under an inert atmosphere for at least a proportion of the process time and, in one preferred embodiment, for substantially the whole process. Within the context of the invention, an inert atmosphere is one which has limited or no ability to react with the primary and/or secondary particles. Preferably, the inert atmosphere comprises argon, nitrogen or a mixture thereof.

Milling media may be used to assist the coating of the primary particles with the secondary particles. The primary particles can themselves act as milling media.

However, the incorporation of further hard, non-contaminating media can additionally assist in the breakdown of the secondary particles where agglomeration has occurred, for example, as a result of the manufacturing process or during transit. Such breakdown of the agglomerates further enhances the coating of the secondary particles on the primary particles. The use of milling media is well-known within the field of powder processing and materials such as stabilised zirconia and other ceramics are suitable provided they are sufficiently hard.

Preferably, the secondary particles may be single crystallites or an agglomerate of many smaller crystallites, for example, platinum group metal blacks.

The coating of the secondary particles on the primary particles may be in the form of a film or in the form of discrete particles. The degree of coverage will depend on factors that include the malleability of the secondary particles, the length of time allowed for the coating process and/or the quantity of the secondary particles present. The secondary particles may be present in any suitable quantity provided the secondary particles coat the primary particles e.g. palladium may be added to titanium alloys in a proportion of about 0.05% to about 0.25%, which is recognisable as the levels of addition in ASTM/ASME Ti grades 7, 11, 16, 17, 24 and 25. The quantity of secondary particles can also affect one or more properties of a desired alloy or cermet subsequently formed. For example, when the quantity of Pd is increased in a Pd/Ti alloy, the corrosion resistance of the alloy to chloride-containing solutions (such as salt water) improves.

The method of the present invention further comprises the steps of:

(a) compacting the coated particles; and
(b) forming an alloy or cermet therefrom.

Suitable methods for compacting either the coated metallic particles or coated ceramic particles include Hot Isostatic Pressing (HIP-ing), Cold Isostatic Pressing (CIP-ing) and Metal Injection Moulding (MIM). The coated metallic particles may also be compacted using high energy beam fabrication methods, such as Direct Laser Fabrication (DLF), and Electron Beam Melting. The coated ceramic particles can also be compacted using slip casting.

Despite the fact that articles produced after compaction have an inhomogeneous distribution of the metal from the secondary particles, the inventors have found that the corrosion resistance of an alloy formed by the claimed method is independent of the method used to compact the particles and equal to the corrosion resistance of articles produced using commercial alloys. Therefore, whichever technique best suits the article to be made from the alloy may be used.

The mechanical properties, however, of the alloy or cermet formed by the claimed method do depend on the method used to compact the particles and, as such, the compaction technique must be carefully selected depending on the required mechanical properties of the final article to be made.

In yet another aspect, the present invention provides an alloy or cermet formed by the claimed method, and articles formed from such an alloy or cermet.

In another aspect, the present invention provides coated particles, wherein the primary particles are coated with secondary particles. The primary and secondary particles are as described above.

EXAMPLES

The invention will now be described by way of the following non-limiting examples.

Example 1

10 g of substantially spherical titanium powder (<45 µm, Advanced Powders and Coatings, Raymor Industries) were weighed into a suitable pot for the Speedmixer™ Model DAC150FVZ. 0.02 g of palladium black (Johnson Matthey) was added, the pot sealed and the contents mixed. The dual asymmetric centrifugal forces were applied for 20 seconds at 1000 rpm and 20 seconds at 2000 rpm.

An image of the coated particles produced by backscattered electron imaging can be seen in FIG. 2. The substantially spherical shape of the coated particles is clearly visible Example 2

150 g of substantially spherical titanium powder (<45 µm, Advanced Powders and Coatings, Raymor Industries) were weighed into a suitable pot for the Speedmixer™ Model DAC600. 0.3 g of palladium black (Johnson Matthey) was added, the pot sealed and the contents mixed for 3×20 seconds at 2000 rpm.

A SEM image of the coated particles produced by backscattered electron imaging can be seen in FIG. 3.

Example 3

25 g of irregular HDH titanium powder (<45 µm, Chemetall Industries) was weighed into a Speedmixer™ pot suitable for the Speedmixer™ Model DAC 150FVZ and 0.05 g of palladium black was added. The pot was sealed and mixed using a cycle with a mixing period of 3×20 seconds. A SEM image of the palladium dispersed on the surface of the irregular primary Ti particles is shown in FIG. 4.

Example 4

30 g of fully-dense substantially spherical zirconium oxide beads (YTZ Grinding Media, Tosoh Corp.) and 0.06 g of palladium black were weighed into the Speedmixer™ pot suitable for Speedmixer™ Model DAC 150FVZ. The pot was sealed and mixed for 3×20 seconds.

The SEM image in FIG. 5 shows the dispersion of the palladium upon the surface of the substantially spherical zirconia beads.

Example 5

30 g of substantially spherical titanium powder (detailed in Example 1) and 0.06 g of ruthenium black powder (Johnson Matthey) were weighed into the Speedmixer™ pot suitable for Speedmixer™ Model DAC 150FVZ. The pot was sealed and mixed using a cycle in which the dual asymmetric centrifugal forces were applied for a total of 180 seconds at 3000 rpm.

The SEM image in FIG. 6 shows the dispersion of the ruthenium powder upon the surface of the substantially spherical titanium powders.

Example 6

25 g of substantially spherical titanium powder (<45 micron, AP&C, Raymor Industries, Quebec) was weighed into a Speedmixer™ pot and 0.139 g of tetraamminepalladium hydrogencarbonate dry powder (Johnson Matthey) was added. The pot was sealed and mixed on the Model DAC 150FVZ for 3×20 seconds. A 5 g sample of the resulting material was heated in a 50 ml/min stream of 5% $H_2$ in $N_2$ at 300° C. for 30 minutes.

The dispersion of the palladium on the surface of the titanium powder, measured using a standard carbon monoxide adsorption technique, was found to be around 3%.

Example 7

25 g of substantially spherical titanium powder (<45 micron, AP&C, Raymor Industries, Quebec) were weighed into a Speedmixer™ pot and 0.106 g of hexakis(aceto)tripalladium(II) Pd-111 dry powder (Johnson Matthey) was added. The pot was sealed and mixed on the Model DAC 150FVZ for a mixing period of 60 seconds. A 5 g sample of the resulting material was heated in a 50 ml/min stream of 5% $H_2$ in $N_2$ at 300° C. for 30 minutes.

The dispersion of the palladium on the surface of the titanium powder, measured using a standard carbon monoxide adsorption technique, was found to be around 3.5%.

Example 8

12 g of 1 mm alumina beads (SASOL, Product Code 1.0/160) were weighed into a pot suitable for the DAC 150FVZ Model Speedmixer™. 0.067 g of tetraamminepalladium hydrogencarbonate dry powder (Johnson Matthey) was added, equivalent to 0.2 wt % Pd on the final coated material. The pot was sealed and subjected to a mixing period of 60 seconds. The resulting composition was heated to 500° C. in an air atmosphere for a period of two hours, during which the palladium salt was decomposed.

The dispersion of the palladium upon the alumina beads, measured using a standard carbon monoxide adsorption technique, was found to be around 4%.

Example 9

A solid CPTi (AP&C, <45 micron powder)+0.2 wt % Pd alloy was prepared by hot isostatic pressing of Pd-coated spherical CPTi powder produced using the dual asymmetric centrifugal forces. The hot isostatic pressing was carried out at 930° C. for 4 hours at 100 MPa.

The corrosion behaviour of the above alloy was compared with that of a wrought titanium Grade (ASTM Grade 7 Ti—Pd alloy—Timet UK Ltd.). Polarisation curves were measured on surfaces ground to 1200 grit, washed in deionised water, rinsed in ethanol and then dried. Testing was performed in 150 ml of 2M HCl at 37° C. immediately after cleaning of the surface.

Polarisation curves, shown in FIG. 7, were measured after 30 minutes immersion at open circuit potential. Scans were carried out from −200 mV to +700 mV, relative to the open circuit potential, at 1 mV/second. Tests were carried out using a saturated calomel electrode (SCE) as the reference electrode and Pt wire as the counter electrode. As can be seen, the corrosion resistance of the alloy produced according to the present invention is substantially the same to that of the commercially available alloy.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A method for forming coated particles comprising coating primary particles with secondary particles using dual asymmetric centrifugal forces, in which two centrifugal forces at an oblique angle to each other are simultaneously applied to the primary particles and secondary particles, wherein:
the primary particles comprise (a) at least one metal, or (b) at least one ceramic;
the secondary particles comprise at least one metal or salt thereof; and
wherein the secondary particles are more malleable than the primary particles.

2. The method according to claim 1, wherein the primary particles comprise the at least one metal and the at least one metal is selected from the group consisting of a single metal, an admix of metals, an alloy and a combination thereof.

3. The method according to claim 1, wherein the primary particles comprise the at least one metal and the at least one metal is selected from the group consisting of Group IVB, Group VB, Group VIB, Group VIIB and Group VIII of the Periodic Table.

4. The method according to claim 1, wherein the primary particles comprise the at least one metal and the at least one metal is selected from the group consisting of titanium, molybdenum, tungsten, nickel and iron.

5. The method according to claim 1, wherein the primary particles comprise the at least one ceramic and the at least one ceramic is selected from at least one of the group consisting of silicon, zirconium, aluminium, yttrium, cerium and titanium.

6. The method according to claim 1, wherein the primary particles are substantially spherical, irregular or a combination thereof.

7. The method according to claim 6, wherein the primary particles are substantially spherical.

8. The method according to claim 6, wherein the primary particles are substantially spherical and have an average diameter of about ≤2000 μm.

9. The method according to claim 8, wherein the primary particles are substantially spherical and have an average diameter of about 1 μm to about 45 μm.

10. The method according to claim 9, wherein the primary particles comprise titanium.

11. The method according to claim 1, wherein the shape of the primary particles remains substantially unchanged during coating.

12. The method according to claim 1, wherein the secondary particles are selected from the group consisting of a single metal, an admix of metals, an alloy, a metal salt and a combination thereof.

13. The method according to claim 12, wherein the secondary particles comprise the at least one metal salt and wherein the coated particles are further processed by thermal means, chemical means or both.

14. The method according to claim 1, wherein the secondary particles are selected from the group consisting of Group VIII, Group IB and Group IIIA of the Periodic Table, and salts thereof.

15. The method according to claim 1, wherein the secondary particles are at least one of the group consisting of platinum, palladium, rhodium, ruthenium, iridium, osmium, silver, gold, cobalt, copper, nickel, iron and aluminium, and salts thereof.

16. The method according to claim 1, wherein the coating of the secondary particles on the primary particles is in the form of a film or in the form of discrete particles.

17. The method according to claim 1, wherein milling media assists the coating of the primary particles with the secondary particles.

18. The method according to claim 1, wherein the dual asymmetric centrifugal forces are applied for a continuous or aggregate period of about 1 second to about 10 minutes.

19. The method according to claim 1, wherein the speed of the dual asymmetric centrifugal forces is about 200 rpm to about 3000 rpm.

20. The method according to claim 1, further comprising the steps of:
(a) compacting the coated particles; and
(b) forming an alloy or cermet therefrom.

21. The method according to claim 1, wherein the secondary particles are single crystallites or an agglomerate of many smaller crystallites.

22. The method according to claim 21, wherein the secondary particles are platinum group metal blacks.

23. The method according to claim 1, wherein the method is carried out under an inert atmosphere for at least a proportion of the time.

24. The method according to claim 23, wherein the method is carried out under an inert atmosphere for substantially the whole time.

25. The method according to claim 23, wherein the inert atmosphere comprises argon, nitrogen or a mixture thereof.

26. The method according to claim 24, wherein the inert atmosphere comprises argon, nitrogen or a mixture thereof.

* * * * *